United States Patent
Gennari et al.

(10) Patent No.: US 8,370,421 B2
(45) Date of Patent: Feb. 5, 2013

(54) METHOD FOR COORDINATING A PLURALITY OF SENSORS

(75) Inventors: Giambattista Gennari, Vicenza (IT);
Giorgio Raccanelli, Vicenza (IT);
Ruggero Frezza, Padova (IT); Angelo Cenedese, Padova (IT); Fabio D'Alessi, Treviso (IT)

(73) Assignee: Videotec S.p.A., Vicenza (IT)

( * ) Notice: Subject to any disclaimer, the term of this patent is extended or adjusted under 35 U.S.C. 154(b) by 205 days.

(21) Appl. No.: 12/600,887

(22) PCT Filed: May 9, 2008

(86) PCT No.: PCT/IB2008/001169
§ 371 (c)(1),
(2), (4) Date: May 18, 2010

(87) PCT Pub. No.: WO2008/142502
PCT Pub. Date: Nov. 27, 2008

(65) Prior Publication Data
US 2010/0293220 A1    Nov. 18, 2010

(30) Foreign Application Priority Data
May 19, 2007  (IT) ............................... MI2007A1016

(51) Int. Cl.
*G06F 15/177*  (2006.01)
(52) U.S. Cl. ......... 709/202; 709/220; 709/224; 348/143
(58) Field of Classification Search .................. 709/201, 709/202, 224; 348/143
See application file for complete search history.

(56) References Cited

U.S. PATENT DOCUMENTS

| | | | | |
|---|---|---|---|---|
| 7,730,172 | B1* | 6/2010 | Lewis | 709/224 |
| 8,131,838 | B2* | 3/2012 | Bornhoevd et al. | 709/224 |
| 2003/0212587 | A1* | 11/2003 | Jamison | 705/8 |
| 2005/0012817 | A1* | 1/2005 | Hampapur et al. | 348/143 |
| 2005/0078172 | A1* | 4/2005 | Harville et al. | 348/14.09 |
| 2005/0146605 | A1* | 7/2005 | Lipton et al. | 348/143 |

(Continued)

FOREIGN PATENT DOCUMENTS
EP    1505796    2/2005

OTHER PUBLICATIONS

Xiao et al., "Scalable Self-Configuring Integration of Localization and Indexing in Wireless Ad-Hoc Sensor Networks," Mobile Data Management, 2006. MDM 2006. 7th International Conference on , vol., no., pp. 151, May 10-12, 2006.*

(Continued)

*Primary Examiner* — Wing F Chan
*Assistant Examiner* — Kostas Katsikis
(74) *Attorney, Agent, or Firm* — Buchanan Nipper

(57) ABSTRACT

Method for coordinating a plurality of sensors, wherein a plurality of networked computers control the sensors for the purpose of executing one or more services requested through the network. In order to coordinate with one another, the computers exchange information over the network in a manner such that each networked computer knows the characteristics of and the services executed by the other computers. Subsequently, the computers providing the same service execute the same configuration algorithm that defines the tasks to be carried out by each computer as a function of the characteristics of the computers providing said same service. Thus, the computers get to the same conclusions as to the tasks to be carried out, and control the sensors based on the tasks defined by the configuration algorithm.

20 Claims, 5 Drawing Sheets

U.S. PATENT DOCUMENTS

| | | | |
|---|---|---|---|
| 2005/0222933 A1* | 10/2005 | Wesby | 705/36 |
| 2006/0007308 A1* | 1/2006 | Ide et al. | 348/143 |
| 2006/0114324 A1* | 6/2006 | Farmer et al. | 348/144 |
| 2007/0043803 A1 | 2/2007 | Whitehouse et al. | |
| 2007/0091856 A1* | 4/2007 | Raina et al. | 370/338 |
| 2007/0209075 A1* | 9/2007 | Coffman | 726/23 |
| 2010/0185754 A1* | 7/2010 | Owen | 709/220 |
| 2010/0214417 A1* | 8/2010 | Gennari et al. | 348/159 |

OTHER PUBLICATIONS

Bramber M et al: "A mobile agent-based system for dynamic task allocation in clusters of embedded smart cameras."

Lopez J M M et al: "Cooperative management of netted surveillance sensors."

International Search Report for PCT/IB2008/001169.

Written Opinion of the International Searching Authority for PCT/IB2008/001169.

EPO Office Action, Application No. 08750911.3, dated Jun. 8, 2010.

B.S. Manoj et al., "On the use of limited autonomous mobility for dynamic coverage maintenance in sensor networks," Computer Networks 51 (2007) 2126-2143.

Communication pursuant to Article 94(3) EPC, EPO Application No. 08750911.3, dated Mar. 18, 2011.

* cited by examiner

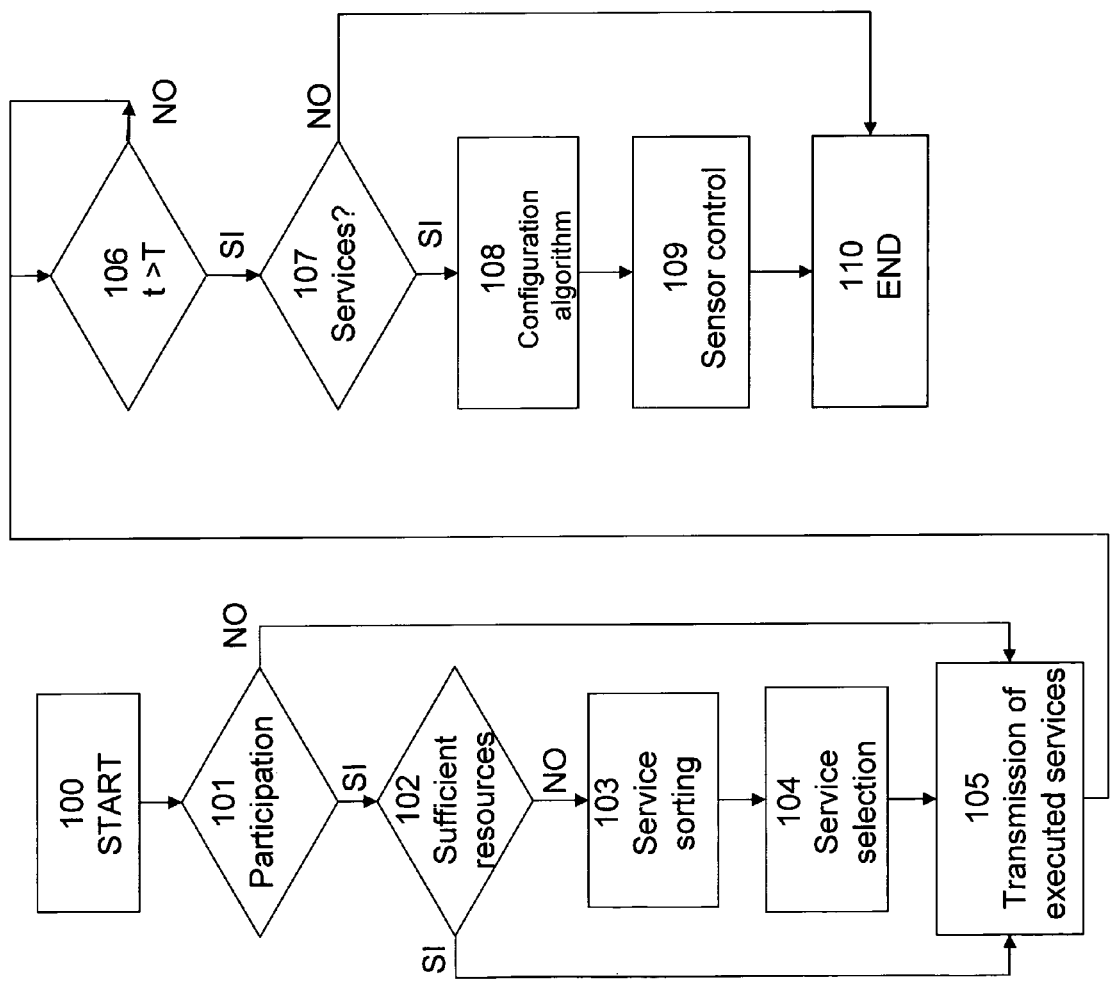

METHOD FOR COORDINATING A PLURALITY OF SENSORS

The present invention relates to a method for coordinating a plurality of sensors according to the preamble of claim 1.

The invention also relates to a sensor system, in particular a detection system comprising a plurality of sensors which coordinate with one another in order to execute one or more services requested to the detection system.

In particular, the invention is preferably and advantageously applicable to a video surveillance system, wherein a plurality of video cameras and sensors of various types (e.g. infrared or microwave sensors) allow to detect events, such as the presence of intruders or a fire, and to signal them to one or more monitoring stations where human operators can take appropriate measures depending on the event detected; for example, an operator may take control of a video camera to shoot a certain area where an intruder or a fire has been detected.

Through the monitoring station, the operator can thus send commands to the different video cameras or, more in general, request services to the video surveillance system, e.g. a sequential view of all the images taken by the video cameras (this function is usually referred to as Patrol) or automatic tracking functions wherein the video cameras are coordinated by the monitoring station for the purpose of tracking a certain target.

According to known solutions, the operator's task is made easier by the execution of scripts at monitoring station level, which scripts may for example position the video cameras in certain preset positions (previously predefined when the system was installed) in response to an alarm detected by a sensor.

In these known systems, the sensors are coordinated in a centralized manner by a central unit sending instructions to the sensors.

However, such systems suffer from the drawback that they do not use advanced coordination algorithms, and therefore cannot properly manage complex situations which require the system to behave dynamically.

In these systems, the coordination of the various devices does not take into account all of the requested services, since it is simply carried out service by service; for example, if the signal of a video camera is required for two different services, the central terminal will try to execute both services as if there were no conflict whatsoever, taking care of dedicating the video camera to the priority service only; the service having less priority will thus be executed incompletely.

Moreover, these systems also suffer from the drawback that, if the detection system is used by multiple operators, conflicts may arise among the different operators' requests.

Also, similar conflict problems are encountered by these systems when there are multiple events taking place or multiple targets to be tracked.

In general, it is known that, as an alternative to centralized control, devices to be coordinated can be fitted with agents capable of coordinating autonomously by negotiating the single tasks to be carried out in order to achieve a certain team result. This solution, which is typically adopted in very specific fields such as robotics (see for example U.S. Pat. No. 6,636,781), has not proven to be very effective in detection systems (in particular, in video surveillance systems), where reactivity and stability are most important.

The time needed for negotiating the tasks among the various devices may in fact be very long when there are a large number of devices and of possible configurations thereof; as a consequence, a system of this kind, wherein coordination is based on negotiation among devices, turns out to be not very reactive and potentially unstable.

For example, let us consider the case of a fire: in response to an alarm, the agents managing the different devices will begin negotiating the tasks to be carried out by each of them.

If the time required for coordination is very long, there will be the risk that the video cameras will coordinate and show the area on fire only when the fire has already broadly expanded.

Furthermore, as the fire spreads out, other sensors will signal a fire alarm in other areas adjoining the first one where the fire started; thus, there will be additional requests for displaying said other areas. If the decision-making process is slower than the progress of the fire, the agents will continue negotiating the tasks to be carried out (which will change according to the requested services) without actually fulfilling the requests; therefore, the system will become unstable.

Similar or worse reactivity problems may arise if long negotiations are needed among agents which have to execute a target tracking service. When the target exits the visual field of a sensor, the neighbouring sensors will coordinate in order to cover the areas where that target may be located. Therefore, the sensors should cover said areas quickly and appropriately, so that the tracking service can go on. If the target exits the range of the sensor which is tracking it before the agents have come to an agreement as to which tasks must be carried out, the tracking service cannot continue any longer.

It follows that detection systems strongly need effective sensor coordination, which allows to optimize the system resources by executing the requested services at best, e.g. by reactively making up for the impossibility of using a certain video camera for a given service by using other video cameras in appropriate positions.

The object of the present invention is to solve the problems of the prior art by providing an alternative method for coordinating a plurality of sensors, as well as a related surveillance system.

This object is achieved through a method and a system incorporating the features set out in the appended claims, which are intended as an integral part of the present description.

The present invention is based on the general idea of using a plurality of networked computers for controlling a plurality of sensors in response to one or more service requests received over the network.

The computers exchange information, so that each computer knows the characteristics of and the services provided by the other computers; thus, all computers know the actual status of the system, and in particular which computers belong to which team charged to execute a given service.

In order to coordinate with one another, the computers participating in the same service execute the same configuration algorithm which returns the tasks to be carried out by each computer.

Since all the computers belonging to a team execute the same configuration algorithm, all of them will detect the same optimal sensor configuration and will control the sensors accordingly.

De facto, sensor coordination is thus obtained by means of a distributed logic, without having to resort to long, complex negotiations among the various computers.

According to a preferred and advantageous embodiment, the computers execute the configuration algorithm periodically; in this way, the system can reconfigure itself dynamically and take into account any changes in the set of requested services or in the set of sensors available to the system for the execution of the various services. This proves to be very advantageous because, in the event of a sensor malfunction or a sensor tampering, the other sensors will coordinate in order to make up for the loss of that sensor.

In addition, the computers can advantageously execute the algorithm in response to a new request, thus ensuring good system reactivity to a service request.

Further objects and advantages of the present invention will become apparent from the following description and from the annexed drawings, which are supplied by way of non-limiting example, wherein:

FIG. 2 is a flow chart of a method for coordinating a plurality of sensors according to the present invention;

Figure 1:
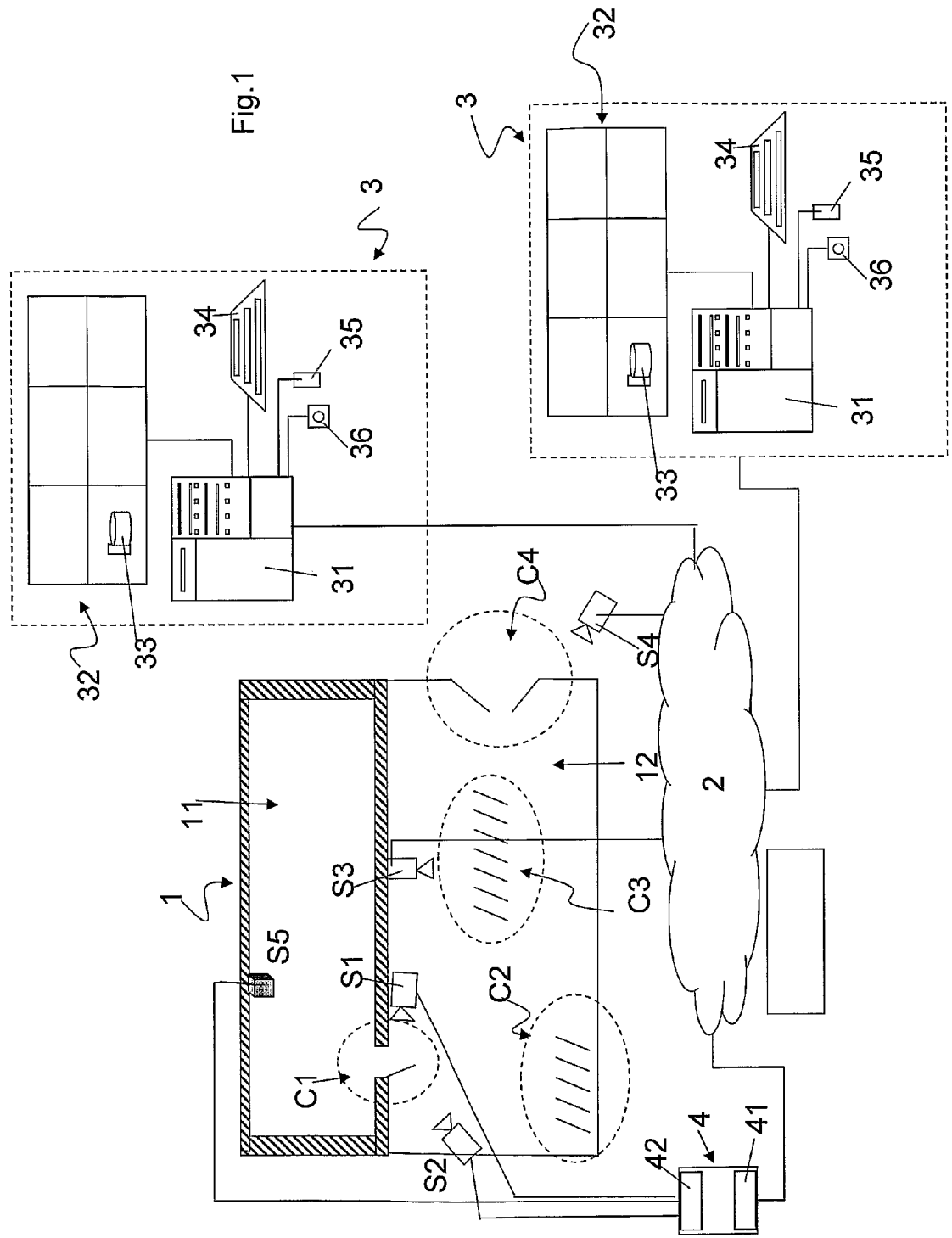
FIG. 1 shows a video surveillance system according to the present invention.

In FIG. 1, reference numeral 1 schematically designates an environment to be monitored. Environment 1 consists of a building 11 and an outdoor courtyard 12.

The following areas of particular interest are identified within environment 1:
a building entrance: area C1;
a parking lot P1: area C2;
a parking lot P2: area C3;
an entrance gate: area C4;

Environment 1 is monitored by means of a video surveillance system comprising a pair of monitoring stations 3 and a plurality of sensors S1-S5 through which the system operators can monitor environment 1.

In the present description, the term 'sensor' will refer to any device which allows to detect a physical quantity (e.g. intensity of electromagnetic signals such as light or radio waves) and to process a corresponding electronic signal.

In this sense, sensors may include smoke detectors (e.g. those based on Tyndall's effect use a photodiode to detect a light signal spreading in the detection chamber in the presence of smoke) as well as video cameras, which transmit a video signal being proportional to the electromagnetic radiation entering the objective lens and striking a CCD (Charge Coupled Device).

In the example of FIG. 1, the areas C1-C4 are monitored by four video cameras S1-S4 and one volumetric sensor S5 arranged within the environment to be monitored.

The number of areas into which the environment is divided and the number of sensors (video cameras and other sensors) are not limiting factors of the invention, but depend on the installer's choices.

Video cameras S1-S4 may be fixed or movable ones, in particular PTZ type (pan/tilt/zoom).

In the example of FIG. 1, video cameras S1 and S3 are fixed video cameras and only shoot respective areas C1 and C3, whereas video cameras S2 and S4 are PTZ video cameras capable of shooting areas C1-C2 and C3-C4, respectively.

Volumetric sensor S5 is a fixed one and sends an alarm signal when it detects motion inside building 11, e.g. because the door of entrance C1 is being opened.

The sensors are controlled by a plurality of computers capable of communicating with one another over a data network 2 in order to send or receive information to/from other computers or monitoring station 3.

For this purpose, the computers are provided with a suitable agent; below, this term will refer to a software or firmware entity capable of acting autonomously in the place of a user and to take decisions about the tasks to be carried out.

The agent is therefore software or firmware which is executed in the computers that control the sensors, and which de facto determines which data is sent by a computer over the network or to the controlled sensors; for this reason, in the present description reference will be made without distinction to either networked agents or networked computers.

The computers may be integrated into the sensors, as in the case of video cameras S3 and S4, or else be server units 4 to which the sensors are connected.

The server units 4 are fitted with a network interface 41, which allows the agent to receive and send data over network 2, and a control interface 42 for communicating with one or more sensors to be controlled.

When the computer and the associated agent are arranged on board of a sensor, that sensor will also be provided with a network interface allowing the agent to communicate over network 2.

Data network 2 may be a wired LAN (Local Area Network), but of course said data network may also comprise wireless elements which may facilitate the installation of the sensors.

In the preferred embodiment, each network node (monitoring stations 3 or computers that control sensors S1-S5) can communicate with any other network node; network 2 may also be subdivided into a plurality of virtual networks (VPN, Virtual Private Network), and the communication between two nodes belonging to different VPNs may be subject to limitations.

Monitoring station 3 comprises a computer 31 which receives images from the video cameras and displays them on suitable visualization means 32 adapted to display a plurality of images 33 simultaneously.

Said visualization means preferably comprise a plurality of screens or a single screen displaying several images next to one another (this solution is known as multiplexing).

Monitoring station 3 also comprises other per se known components, such as a keyboard 34, a mouse 35 and a joystick 36 used by the operator for controlling PTZ video cameras by changing the pan, tilt and zoom angles thereof.

Like the visualization means, these components are also connected to computer 31, which is equipped with suitable interfaces, e.g. an interface for joystick 36, video interfaces for sending the images received from video cameras S1-S4 to visualization means 32, and a network interface through which the control data is sent to the video cameras.

This user interface, along with the keyboard, the joystick and the mouse, allows the user to select and control the video cameras, thus activating the transfer of an image from one or more video cameras to visualization means 32.

When any of areas C1-C4, e.g. parking lot P2, is selected, an image is transferred from a video camera, e.g. S2, which is automatically associated with the selected area according to a predetermined criterion aiming, as described below, at maximizing the probability of detecting an anomalous event within an area of interest.

In order to execute the services requested to the system by the operator (e.g. controlling video camera S2 or covering cell C3), the monitoring station sends a service request over the network, which request is then processed by the computers' agents according to a strategy as described below, which will lead to determining which computers must participate in the service and how such computers must control the respective sensors in order to fulfill the operator's requests.

In order to provide coordination, the surveillance system of FIG. 1 therefore uses a distributed architecture with no central coordination node: all network nodes (computers controlling sensors and monitoring stations) are peer nodes, i.e. nodes in equal relationships with one another.

In order to coordinate with one another (and consequently also coordinate the sensors), all the agents connected to network 2 exchange information, so that each agent knows the status of the video surveillance system.

In particular, from each agent information is made available to the other agents about the status of the computer and the activities currently carried out by that agent; for example:
- general data regarding the operation of the computer: e.g. presence of activities, CPU load, number of accesses to the computer, etc.;
- data regarding the services the agent is currently working at: e.g. type of service, identifier of the monitoring station that requested that service, status of service, status of the sensor used for executing the service, etc.;
- detected events.

In a preferred embodiment, service requests are sent indiscriminately to all nodes of network 2, although different solutions are also possible, which will be described in detail below.

The service requests can be sent either by the sensor control agents or by monitoring stations 3; in this manner, the sensor control agents will respond to the operator's requests as well as to requests from other agents.

For example, if the agent which controls volumetric sensor S5 sends a request for covering with the video cameras an area where an intrusion has been detected, the agents which control video cameras S1-S4 will coordinate to cover said area other service pending requests permitting.

Periodically or when a request is received, the agents implement the coordination strategy described below, according to which agents participating in the same service implement the same configuration algorithm which outputs the optimal configuration of the agents involved in the execution of the service; this configuration is the one that allows to execute the requested services at best, possibly by optimizing the utilization of the system resources.

Since the agents implement the same algorithm by starting from the same input variables (relating to the status of the system), they will get to the same conclusions as to the optimal configuration of the controlled sensors; in particular, the agents know, for example, how a given video camera must be positioned and which zoom value it must be set to, which video camera must transmit the acquired video to a given monitoring station, which video camera must store the acquired video signal, etc.

Strategy

The preferred coordination strategy is implemented periodically by all agents and is structured into two steps:
- formation of the teams of agents that participate in the execution of the various services requested to the network;
- definition and application of the team strategy for a given service. Said strategy is carried on by referring to an algorithm, called 'coordination algorithm', the first part of which (team formation) is identical for all networked agents, whereas the second part (team strategy definition) is identical for all agents belonging to one team.

The coordination algorithm (i.e. the set of operations to be carried out in order to attain sensor coordination) will now be described with reference to FIG. 2.

After the algorithm has been started (step 100), the agent which is executing the coordination algorithm first verifies (step 101) if one of its controlled device can be involved in the execution of one or more services requested to the system.

With reference to the example shown in FIG. 1, if there is only one request requiring to monitor the entrance of building 11 (cell C1), the agent that controls video camera S4 will determine that it cannot participate in the requested service because video camera S4 cannot shoot that area from any position.

If the agent does not participate in any service, then it will send over the network information indicating its status and that it will not participate in any service (step 105).

On the contrary, if the agent can be involved in the execution of one or more services, it will determine (step 102) whether it has sufficient resources for executing all the services it can be involved in; if yes, it will inform the other networked agents by sending updated information about its status, indicating that it will not participate in any service (step 105).

If the agent's available resources are not sufficient, it will sort the requested services (step 103) it can be involved in according to an appropriate priority plan.

Such a priority plan may, for example, refer to priority levels assigned to the operators, to monitoring stations 3, to the different services, etc.

Thus, for already served operators having the same priority and requesting different services, reference will be made to the priority assigned to the various service types. For example, services requiring coverage of areas will have lower priority than other services requiring the control of a certain sensor. In fact, the former can be provided more freely by different agent subsets, whereas the latter allow no freedom of choice (the request concerns a specific sensor).

After sorting has been completed, the agent selects (104) the services in which it will participate by starting from the one having the highest priority, until its available resources are exhausted.

The set of services thus chosen by the agent is then made available to all other networked agents (105).

The coordination algorithm then waits a preset period of time T (step 106) until it receives updated information about the status of the other agents on the network.

At the end of this first step of the coordination algorithm, each agent knows which agents have been assigned its very same services, i.e. the components of the team.

At this point, it should be remarked that in this embodiment the team formation process (steps 100-106) requires no collaboration among the agents, since each agent chooses the services in accordance with a priority plan, independently from the other agents.

As a matter of fact, the second step of this strategy is only carried out by those agents which participate in a service of some kind.

At step 107 it is verified whether the agent must participate in some service or not.

If not, the agent will terminate the cooperation algorithm (step 110); otherwise, each agent participating in at least one service will execute a specific configuration algorithm (step 108) for each service it must participate in.

For example, all those agents which must participate in a coverage service requested for a particular environment area will execute the same algorithm for optimal coverage which, by using as inputs the characteristics of the agents belonging to the team, will return the optimal team configuration specifying the tasks that each agent will have to carry out in order to provide the best coverage of a given area.

Thus, the team agents will get to the same conclusions and will control the respective sensors in a coordinated manner, according to a logic (defined by the configuration algorithm) which is common to all agents.

Some examples of configuration algorithms will be provided at the end of the present description.

Once the various configuration algorithm have been executed (e.g. optimal coverage or leader election algorithms), the output of which is the set of tasks to be carried out by each agent, the agents will control the respective sensors accordingly (step 109); the coordination algorithm will then end (step 110).

Although in the above-described embodiment the coordination algorithm is executed periodically (e.g. every time a timer trips), according to another possible embodiment the algorithm is also (or, alternatively, only) executed in response to a change in the set of services requested to the system. Said change is known to all agents, which are always aware of all the services requested to the system.

Network Communication Methods

In the preferred embodiment, different communication protocols are used for the communication among the network nodes depending on the type of information to be sent, in particular:

for information to be shared among all network nodes (e.g. agent status information and service requests), pulsed broadcast communication is used;

for information addressed to a specific monitoring station (e.g. audio/video streaming and control data streaming), point-to-point or point-multipoint communication is used;

Pulsed Communication

With this type of pulsed communication, data packets are sent simultaneously and repeatedly to multiple nodes; such data packets are called 'heart beat' (because the repetition/pulsation of the data resembles a heart beat).

Heart beat pulsation generally takes place over the network at a predetermined frequency in the range of a few Hertz, without any synchronism being required among different agents' heart beats.

The frequency is determined during the planning stage of the surveillance system, and is set during the setup stage of the surveillance system.

The frequency value affects how quickly the networked agents will receive the status information of every other agent: for example, with a 0.1 Hz frequency, a status change occurring immediately after the generation of a heart beat, i.e. not sent by means of that heart beat, will only be communicated over the network when the next heart beat is generated, that is, with a delay of almost ten seconds.

From a purely theoretical point of view, if the heart beats were pulsed at a very high frequency, in theory at an infinite frequency, the network status information would be updated in real time; however, from a practical point of view, in an actual surveillance system a high transmission frequency would cause an excessive increase in the number of transmitted packets, with two negative consequences:

increased workload of each network node, which on one hand must generate a higher number of heart beats and on the other hand must receive and analyze a lot more packets (a node receives the heart beats of various other nodes, which in turn generate a lot more heart beats during the same time unit);

increased network traffic.

Experimental tests have shown that, for video surveillance applications wherein the network status also includes the position of panning devices moving at a speed of several degrees per second, a good pulsation frequency is between 1 Hz and 5 Hz, more preferably between 1 Hz and 2 Hz.

With the pulsed communication according to the invention, an agent can generate asynchronous heart beat packets, i.e. which add up to those which would normally be pulsed repeatedly by the agent.

Asynchronous packets are particular important, in that they ensure that critical data, such as data about the detection of anomalous events, are broadcast over the network in a timely manner.

Such a process for the asynchronous generation of heart beat packets is preferably only triggered as necessary (e.g. when an event is detected), so that the system is not affected by problems like those caused by an excessive heart beat generation frequency.

Being based on data retransmission, pulsed communication is robust to transmission errors.

Preferably, pulsed communication also includes a broadcast transmission of the heart beat to all network nodes.

This broadcast communication allows the network of peer nodes to attain information redundancy over multiple nodes: the selection of the useful information to be analyzed or recorded is under the responsibility of every single node. This process ensures optimized data redundancy. In the case of broadcast communication, it is even possible to leave the knowledge of the network structure and of the network addresses of the other nodes as well as the processing of complex redundancy node selection and communication strategies completely out of consideration.

Information Sent Through Pulsed Communication

The following information is sent through pulsed communication:

1. information about the network status: it comprises status information of each agent and detected events; this type of information must always be up-to-date, i.e. it must concern the current node status; therefore, status pulsation continues throughout the life of the system;

2. request of services to the network: the pulsation of this type of information begins when the service must be provided and ends when the service must be terminated;

3. audio/video samples sent by an agent to other network nodes.

This information is encoded within the heart beat.

As far as network status information is concerned, pulsation-based communication allows up-to-date information to be distributed while preventing a node from having to send specific requests in order to update its own knowledge of the network.

As concerns service requests, on the other hand, pulsed communication allows to implement a communication protocol which includes no stop messages: a service is started from the first request packet, and is then terminated as soon as the pulsation of the respective request ceases. A protocol in which the termination of a service is based on the transmission of a stop message would not be very robust to communication errors, thus requiring the implementation of communication control blocks to ensure retransmission in the event of packet losses: such control blocks are often very complex and require that the addressee of the stop message be known.

In addition, the pulsing of the service request brings the advantage that the request becomes persistent: an agent which cannot reply immediately to a request will be able to do it afterwards by joining those agents which are already working at the requested service.

Among service requests, it is particularly worth mentioning sensor control requests (e.g. a request for the control of a video camera) and queries (requests for data from a database, e.g. a system operator's login information).

The pulsed communication process is also used for transmitting samples of an audio/video signal which are suitable for partially reconstructing the original signal (but not for reproduction); such samples are therefore obtained through a low-frequency sampling of the audio/video signal.

This latter type of information has been added for allowing other agents to record it, so that the video signal can be recovered even when the originating agent is irreversibly damaged or removed.

The low frequency of sampling and transmission of the data over the network agrees with the necessity of minimizing the band used by each agent as well as the sample reception and saving workload.

Protocol for Service Requests

As mentioned above, service requests are sent through pulsed communication.

In this case, the communication protocol includes the following steps.

A network node (client) pulses the service request (task) over the network to all other network nodes in broadcast mode.

Said request only contains information that describes which task is to be obtained, without it being necessary to know which agent will reply to the request: the information to be supplied by the client only specifies the task to be obtained.

As described above with reference to FIG. 2, the agents that meet the client's needs and can execute the service will accept the request and communicate their acceptance of the service request through heart beat.

This is how the 'start' command for the service in question is implemented.

Since the protocol does not provide an explicit stop command, the client will keep pulsing the same service request as long as it is interested in it.

When the client wants to stop the service, it will stop pulsing the relevant request.

The agents analyzing the pulsed packets will record the time of arrival (Time Stamp) of each accepted packet and will remove all packets having a time stamp which is not recent enough, in accordance with the following formula:

if $(t-\text{TimeStamp}) > \text{TimeOut}$ then the task will be removed where t is the current time and TimeOut is a predetermined time value.

Consequently, an agent will keep participating in a service for a time at least equal to TimeOut from the last pulsed request.

This process prevents any communication problems which may cause the loss of some request packets from leading to a service interruption. Preferably, TimeOut is inversely proportional to the pulsation frequency according to the following formula:

$$\text{TimeOut} = K/f$$

where f is the pulsation frequency.

This implies that, when the communication takes place normally for a time interval equal to TimeOut, a number K of packets should arrive at the server; the service will therefore be stopped only if none of said K packets reaches the destination. The higher the value K, the less likely it is that the unsuccessful reception of all packets is due to communication errors: therefore, the agent can infer that it is an intentional stop commanded by the client.

Note that TimeOut is directly proportional to K: it follows that an increased value K will cause an increased minimum time during which an agent stays at the client's disposal after the last pulsation, thus preventing it from carrying out other tasks.

Therefore, the choice of K, and thus of TimeOut, involves a trade-off between robustness to communication errors and resource release time.

Experimental tests have shown that K=3 is a good value which is particularly suited to surveillance systems.

Protocol for Control Requests

In this case, the communication protocol includes the following steps.

A monitoring station pulses a request for obtaining direct control of a particular device over the network.

Said request only contains information that describes the sensor to be controlled, without it being necessary to know which agent will reply to the request: the monitoring station must only provide the sensor identifier, such as a label (e.g. 'VIDEO CAMERA 5') entered at system setup.

The request is received by all other networked agents, which execute the above-described coordination algorithm.

Following said algorithm, only the agent that controls the sensor determines to be able to participate in the service (step 101 of FIG. 2) and communicates its acceptance of the service request through heart beat (step 105).

Since the requested service is the control of a given sensor, the team participating in the service consists of a single agent whose only function is to enable (steps 108 and 109 of FIG. 2) the normally disabled dedicated communication module in order to establish a channel for communicating with the monitoring station.

By analyzing the heart beats received from every agent, the monitoring station can determine which agent has been enabled and can extract the information which is useful for establishing a point-to-point connection to such agent. At this point, the protocol requires the monitoring station to establish a point-to-point connection to the selected agent, which will receive the control signal over the newly established communication channel.

As the operator is controlling the sensor, the agent will keep receiving heart beats from the network; when the client stops pulsing the control request, the agent will close the connection to the client.

Query Reply Protocol

In this case, the communication protocol includes the following steps. The client (i.e. the requesting node) pulses the query request over the network.

Said request only contains indications about the status information that the client wishes to obtain, without it being necessary to know which agent will reply to the request.

The agents evaluate whether they can reply or not to a query reply request, and communicate their decisions to the other agents over the network.

Thanks to the leader election algorithm, a leader agent is determined which enables a normally disabled dedicated communication module.

By analyzing the received heart beats, the client can determine which agent has enabled the dedicated communication module and can extract the information which is useful for establishing a point-to-point connection to such agent. At this point, the protocol requires the client to establish a point-to-point connection to the selected agent. Specific queries and the associated replies will be routed over the newly established communication channel.

When the client stops pulsing the query request, the agent will close the connection to the client.

Point-Multipoint Communication

This type of communication is used for transmitting information from an agent to one or more predetermined agents or monitoring stations only; in this section, the addressees of such information will be referred to as clients.

This type of information is used for sending signals like a bit stream that encodes the audio/video stream in order to be suitable for reproducing the original signal.

In this case, each networked agent acts as an audio/video server, so that one or more clients can connect to the agent and request the transmission of said bit stream.

In this case, the communication protocol includes the following steps.

Il client pulses a request for obtaining the audio/video signal over the network; said request only contains information that describes which signal is to be obtained, without it being necessary to know which agent will reply to the request.

Since every agent is connected to audio and/or video sensors monitoring areas, the information to be supplied by the client is the identifier of the sensor to be contacted or the area to be monitored.

The request is received by all agents, which will then decide (depending on the characteristics of the respective sensors and on suitable priority plans) whether to participate in the requested service or not (steps 101-104 of FIG. 2).

Those agents which comply with the client's needs will reply to the service request and communicate their acceptance thereof by heart beat (step 105 of FIG. 2).

If the request concerns a particular sensor, then only one agent will be able to respond; instead, if the request regards the acquisition of the image of a given area, then several sensors will be able to respond and an algorithm for optimal coverage will have to be executed (step 108) in order to determine which sensor must be used for serving the operator at best.

The agent controlling the sensor thus selected will then enable the normally disabled communication module dedicated to the audio/video bit stream.

By analyzing the received heart beats, the client can determine which agent(s) has(have) enabled the dedicated bit stream transmission module and can extract the information which is useful for establishing a point-to-point connection to such servers. At this point, the protocol requires the client to establish a point-to-point connection to the selected servers, which will send the audio/video bit stream over the newly established communication channel.

When the client stops pulsing the streaming request, the server will stop the bit stream and close the connection to the client.

Variants

According to the preferred solution, pulsed communication is used for broadcasting information to the network nodes.

This solution however implies putting considerable load on the network, both in terms of workload to be handled by each node (e.g. reception and analysis of input heart beats) and in terms of network traffic.

This problem is especially felt when the number of nodes (agents and monitoring stations) and of requested services is very large.

In an alternative embodiment, the agents are grouped on the basis of their characteristics of vicinity or affinity for executing specific services.

In this embodiment, the agents of a team only send their status information to the other agents belonging to the same team, thus using multicast pulsed communication or, more generally speaking, point-multipoint communication.

In this case, the heart beat also contains information about the addresses of the target agents.

According to this embodiment, an agent may belong to several adjacent teams, thus allowing information about a detected event to be propagated from one team to another: the agent of a team that has detected an event will communicate the same information to all the teams it belongs to, thus allowing the agents of the adjacent team to be prepared, for example, to monitor an area adjoining the area where the event has been detected.

It is clear that other variants of the above-described surveillance system and method of cooperation among agents are also conceivable.

For example, the team formation process (first step of the above-described strategy referring to the preferred embodiment example) may be cooperative as well, instead of being carried out independently by every agent, so that each computer knows which other computers are also carrying out a certain service.

In this embodiment, each computer (thanks to the respective agent) evaluates the set of service requests received over the network and selects those services in which it can participate. Subsequently, each computer informs the other computers about the services in which it will participate, and receives over the network the list of services which can be executed by each computer.

At this point, each computer has a complete list of the services which are executable by each networked computer, and executes a service assignment algorithm which returns the services in which each agent must participate.

Since every agent executes the same algorithm, all the agents of the various computers will get to the same conclusions as to the services to be executed by each of them; the second step of the strategy will then be carried out, executing the configuration algorithm as described above with reference to FIG. 2.

According to the invention, the problem of cooperative service selection is preferably faced like a sort of optimal coverage problem (see the algorithm described below), the objective of which being, instead of determining the optimal positions of the sensors for covering a given area of the environment, to determine which service(s) is(are) to be selected by each agent in order to provide the best coverage of the set of services.

The service assignment algorithm will thus be a sort of algorithm for optimal coverage, the inputs of which are the set of requested services (instead of the area to be monitored) and the set of sensors.

To complete the analogy with the algorithm for optimal coverage, the probability of detecting an event through a sensor in a given area corresponds to the probability (equal to 1 or 0) that a sensor will carry out a given task.

Based on this information, the algorithm will thus optimize the probability of carrying out the set of tasks by using the available sensors.

Examples of Configuration Algorithms

Leader Election

In the 'leader election' algorithm, the agents choose a representative (leader) for replying to the operator's queries, i.e. requests for accessing to information contained in a network data bank.

The choice of the leader agent is based on the criterion of minimum CPU load, and leads to a univocal selection.

The 'leader election' algorithm uses as inputs the CPU load information of the agents participating in the election of the leader (which at the very most may be all networked agents); this information is made available over the network through the heart beats sent over the network at the end of the first step of the above-described coordination algorithm (team formation).

Then the algorithm compares the CPU loads of all computers participating in the election of the leader, and chooses as a leader that computer which has the lowest CPU load.

If there are several computers having the same lowest CPU load, the algorithm will choose as a leader the one with the lowest identifier: this means that, given two computers A1 and A2 having the same CPU load, the algorithm will select the computer A1 as a leader.

Preferably, the algorithm also compares the lowest CPU load with the CPU load of the computer which was the leader before the algorithm was executed, and will select the computer having the lowest load only if such lowest CPU load is lower than that of the previous leader by a preset threshold.

In the ideal case in which all computers receive the same information and execute the algorithm simultaneously, the output of all computers will be identical.

In practice, however, the network status is propagated asynchronously and the algorithm is executed independently, i.e. at different times, by the agents; this may potentially lead different agents to different conclusions.

In order to make the algorithm robust, the input data is preferably pre-processed by executing a moving average over a time interval $$\tau = k/f$$

where k is a whole number and f is the frequency at which each agent executes the leader election algorithm.

Experimental simulations have shown that the optimal range ensuring the proper operation of the algorithm is $5 < k < 10$.

Coverage Algorithms

The coverage algorithms described below require that the environment to be monitored be subdivided into adjacent cells associated with the sensors (and therefore with the agents controlling them) that allow to monitor said cells.

The cell-based model of the environment is stored in every computer and every monitoring station at the end of a system setup stage.

An example of system setup will be described below, though several other solutions for configuring the surveillance system are possible as well.

System Setup

According to the invention, during the setup stage of the surveillance system a model of the environment is created by defining the areas of interest C1-C4 of the environment and the adjacencies thereof.

In the following description, the areas of said model will be called 'cells' in order to avoid any confusion with the physical areas of the environment.

Subsequently, each cell C1-C4 is associated with one or more sensors capable of monitoring at least a portion of the area corresponding to that cell.

In particular, since PTZ video cameras can take a plurality of positions, each cell is associated not only with a video camera, but with a video camera in a given position (called 'preset').

Of course, for fixed video cameras or sensors there is only one predetermined position which is set when the sensor is installed.

During the setup stage, the sensors are activated sequentially.

For each mobile video camera or sensor, the operator defines the preset positions of the mobile sensor which best meet the operator's surveillance needs.

For each preset position, the operator associates the sensor with an area of the environment through selection means, and assigns a monitoring judgments (e.g. expressed as a value between 0 and 1) representing the quality of the image taken.

The monitoring judgments corresponds to an estimation of the probability of detecting through said sensor an event occurring within the cell with which the sensor in a certain preset position has been associated.

In the operational stage, this allows to control the sensors by positioning them in those preset positions that maximize the probability of monitoring the environment.

The examples of FIGS. 3a-3c and 4a-4b illustrate two different environment models, which are used by the user interface for showing the environment to be monitored to the installer and for allowing him to select an area.

Figure 3A:
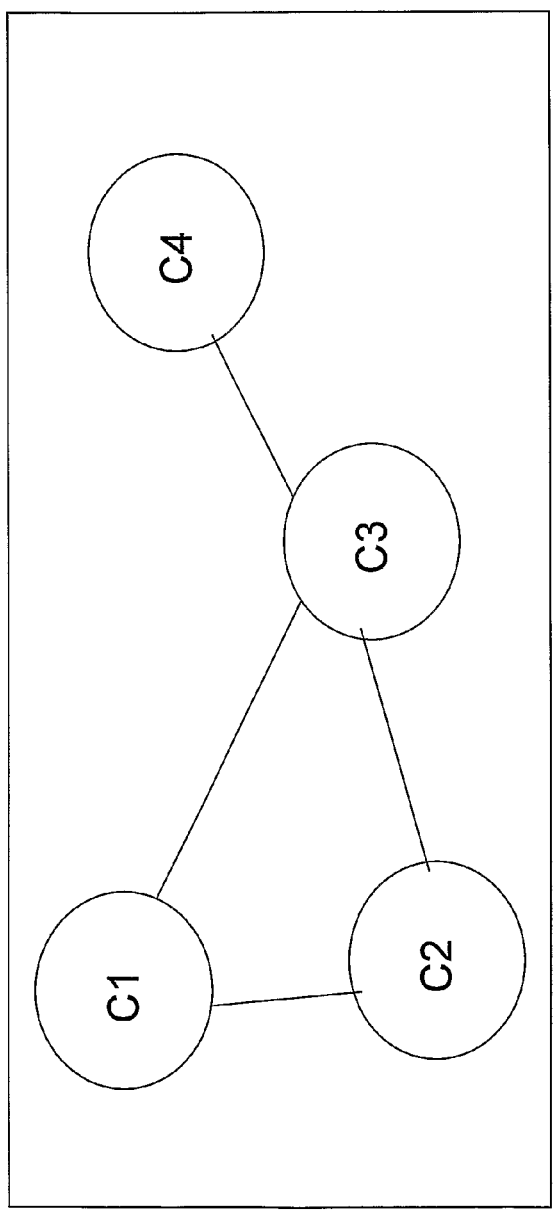
FIGS. 3a, 3b and 3c show an environment model used by the system for activating the video cameras.
Figure 3B:
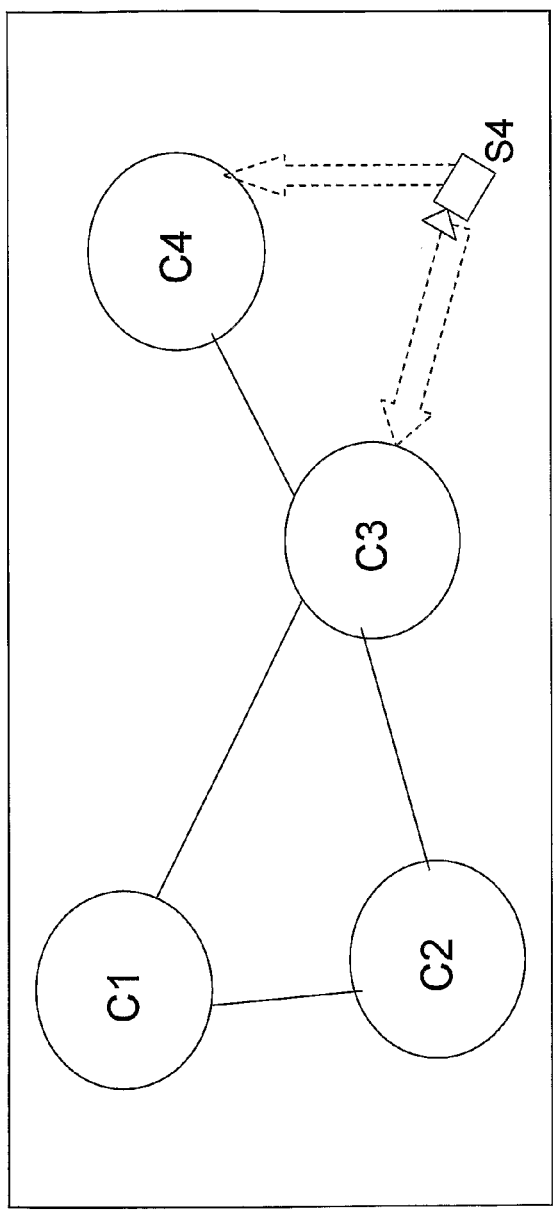
Figure 3C:
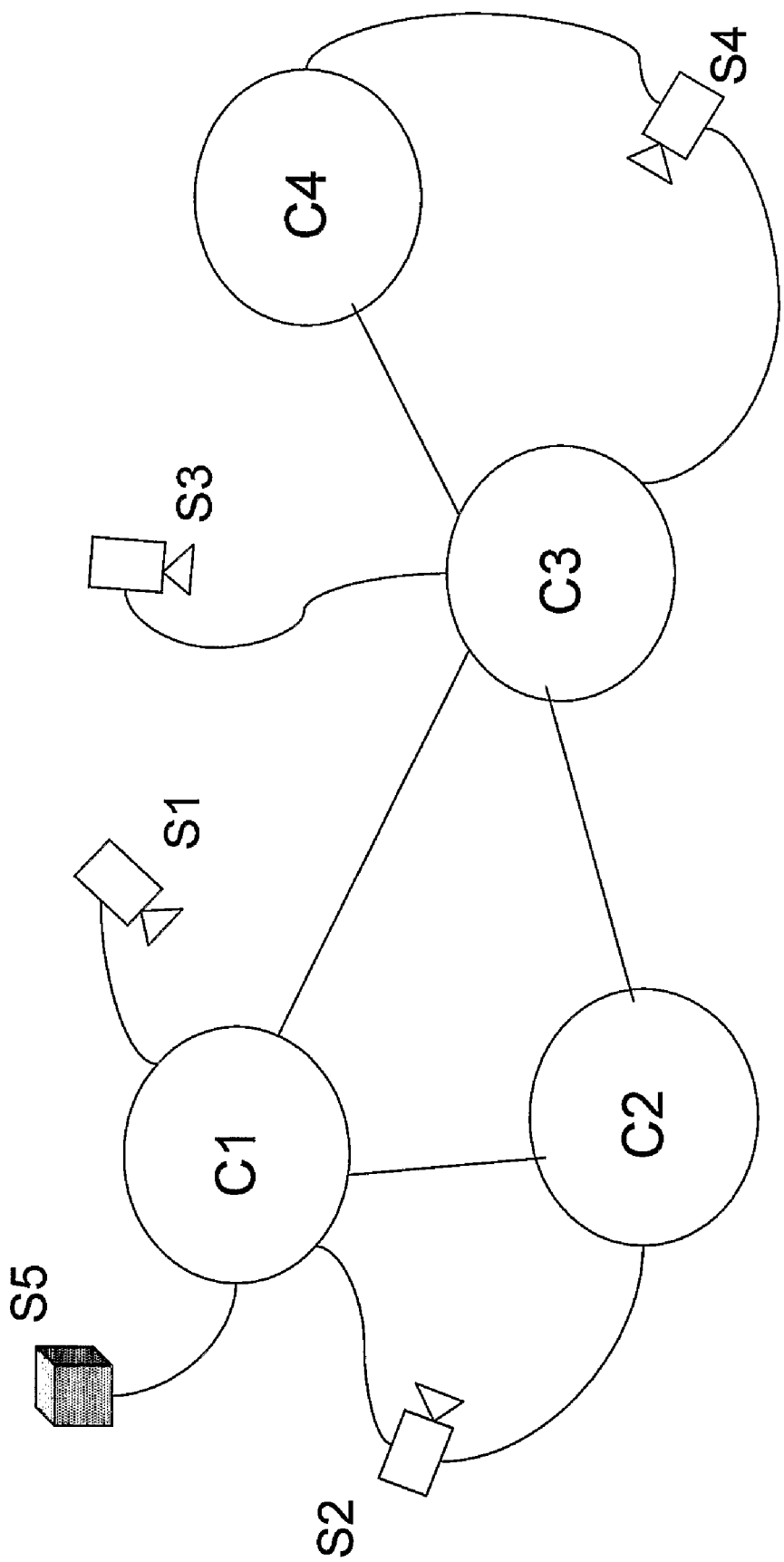

With reference to the example of FIGS. 3a, 3b and 3c, the program providing the user interface allows to define a list of cells and the connections thereof through a graphic interface that allows to draw a graph in which the cells are represented as nodes connected by arches.

Advantageously, the spatial arrangement of the nodes is free, so that during the setup stage the operator can arrange them in such a manner as to reflect the geographical arrangement of the areas to be monitored, thus allowing the watchman to immediately find the area to be monitored during the operational stage.

According to an alternative solution which is less complex from a computational viewpoint but slightly less user-friendly, the definition of the areas and connections thereof can be done in text mode.

Referring back to the example of FIGS. 3a-3c, in the setup stage the operator creates the environment model and then activates the sensors sequentially (e.g. cycles the video cameras). For each sensor, the operator verifies the monitored area (e.g. he sees the image taken by a video camera on the screen) and creates a connection with the model areas while assigning a monitoring judgment.

The sensor/area connection may be provided by drawing a link between the icon representing the sensor and the block representing the framed area.

In this manner, a cell/sensor graph is created like the one shown in FIG. 3c.

The preset of the sensor and the monitoring judgment are stored into a database of the control system by the software.

Figure 4B:
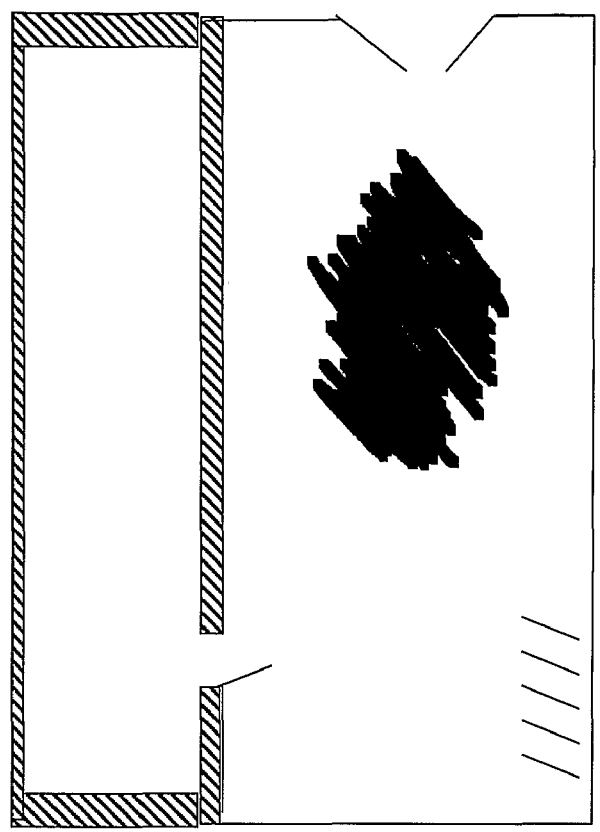
FIGS. 4a and 4b show an environment model used by the system for activating the video cameras.
Figure 4A:
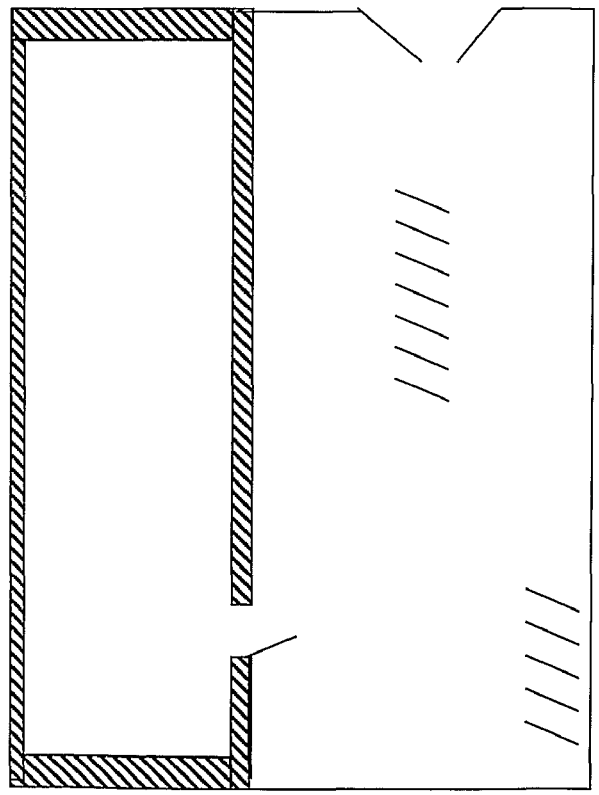

In the example of FIGS. 4a-4b, the environment model consists of a map of the area to be monitored.

The map, shown in FIG. 4a, may be built electronically by the operator by using common graphic programs, or it may be an imported graphic file.

In the solution of FIGS. 4a-4b, during the setup stage the operator selects a sensor and, for each preset position, marks the monitored area on the map, as shown in FIG. 4b, and associates a monitoring judgment, e.g. by typing a value on keyboard 34 or by selecting a displayed value with mouse 35.

When a group of pixels corresponding to the area monitored by the sensor is selected, the software will automatically create the model cells and the respective adjacencies. In an embodiment of the invention, each pixel selection corresponds to one cell of the model.

Neighbouring pixel groups are adjacent cells.

In a preferred embodiment, pixel groups overlapping each other to a sufficient extent are grouped into a single cell.

The criterion used for deciding whether two pixel groups should be grouped together into a single cell or not is defined during the programming stage: if two pixel groups just touch, it may in fact be preferable to keep the two cells separated.

The geometrical information associated with each cell (area, shape) and the information about the direction of transit between the cells are extracted automatically.

Barriers may be included in the map which will be taken into account when calculating adjacencies; for example, two non-communicating rooms are not adjacent to each other.

Other information (cell labels, area mobility, time-dependent barriers, arch orientation, etc.) may be added by the user once the model has been built.

When setup is over, the control system will draw a cell/sensor graph like the one shown in FIG. 3c.

Heuristics for the Coverage

A first coverage algorithm example utilizes a heuristics which allows to define an optimal sensor configuration with a limited computational effort.

Initially, the heuristic chooses that sensor which has the lowest number of degrees of freedom (lowest number of possible positions); if the number of degree of freedom is equal, the sensor having the lowest identifier will be chosen.

Among the possible positions of this sensor, the heuristic chooses the one having the best visibility; if visibility is the same, the selected position will be that which sees the cell having the lowest identifier, e.g. cell C1 will be preferred over C2.

Once the first sensor in the respective position has been chosen, the degrees of freedom of the unselected sensors will be recalculated without taking into account the already assigned cells.

The previous steps will be repeated until all sensors will be assigned to respective cells.

Algorithm for Optimal Coverage

The algorithm for optimal coverage receives as input an area of interest (obtained from the service request) and a set of sensors (obtained from the heart beats), and outputs the optimal configuration of the sensors for covering the area of interest.

This translates into maximizing the probability of detecting an anomalous event occurring within a given area of interest.

In particular, it is assumed that the area of interest is a set of N cells of the environment model built during the setup stage.

$C_i$ designates the anomalous event occurring in cell i.

The surveillance system comprises M sensors, $x_j$ designating the position of sensor j.

In particular, for PTZ (Pan Tilt Zoom) sensors the position may take values within a finite discrete set of values called presets.

A fixed sensor may be treated like a particular PTZ sensor with only one preset.

In general, the position of a sensor may take values within a continuous domain and may comprise geographical coordinates for sensors located on mobile means (patrol car, robot, etc.).

The detection of an event being designated D, the expression $$p(D|C_1 \cup C_2 \cup \ldots \cup C_N, x_1, \ldots, x_M) \quad (1)$$

indicates the probability of detection of an anomalous event on condition that the event occurs in only one of N cells associated with the environment portion to be monitored and that M sensors are in certain preset $x_j$.

The problem of optimal coverage of a given area therefore translates into finding the optimal sensor configuration that will maximize said probability. Said configuration may be expressed as:

$$\hat{x}_1, \hat{x}_2, \ldots, \hat{x}_M = \underset{x_1, \ldots, x_M}{\mathrm{argmax}}\, p(D|C_1 \cup C_2 \cup \ldots \cup C_N, x_1, \ldots, x_M) \quad (2)$$

The detection probability may be expressed as:

$$p(D|C_1 \cup C_2 \cup \ldots \cup C_N, x_1, \ldots, x_M) = \frac{\sum_{i=1}^{N} p(D|C_i, x_1, \ldots, x_M) \cdot p(C_i)}{\sum_{i=1}^{N} p(C_i)} \quad (3)$$

The above expression is obtained by exploiting the immediate observation that the occurrence of an event in cell i is independent of the position of M sensors, i.e. $p(C_i|x_1, \ldots x_M) = p(C_i)$.

The probability $p(C_i)$ that the event occurs in a given cell i can be proportional to the size of the corresponding area and to the criticality that characterizes the cell from the surveillance point of view.

For simplicity's sake, it will be assumed below that all the areas of the model have the same probabilities; the detection probability expression will thus become:

$$p(D|C_1 \cup C_2 \cup \ldots \cup C_N, x_1, \ldots, x_M) = \frac{\sum_{i=1}^{N} p(D|C_i, x_1, \ldots, x_M)}{N} \quad (4)$$

Where $p(D|C_i, x_1, \ldots x_M)$ is the detection probability of an event, the latter occurring in the cell i and the sensors being in certain preset $x_j$.

Now let us consider the case wherein a given cell is watched by a single sensor of the surveillance system, e.g. sensor 1.

It is thus obtained that $p(D|C_i, x_i, \ldots, x_M) = p(D|C_i, x_1)$, i.e. the detection in cell i, does not depend on the position of those sensors that are not monitoring cell i.

$p(D|C_i, x_1)$ is assumed to be the monitoring judgment assigned by the installer when setting up the surveillance system. In more detail, said monitoring judgment is the one that was assigned to sensor 1 in the position $x_1$ when it was associated with cell i.

Quite reasonably, if the monitoring judgment is high, then the probability of detecting an event in the given area of the model will be high as well. Vice versa, if the judgment were zero, it would be impossible (null probability) to attain a detection in the given cell with sensor 1 in the preset $x_1$.

Let us now consider the case wherein a cell i is watched by multiple sensors in appropriate preset.

Aiming at helping the installer, the above-described setup procedure does not provide combined monitoring information.

For this reason, in the absence of such information the worst case will be taken into account: the sensor having the highest visibility is found and it is assumed that the other sensors cannot add any information which may increase the visibility of the given area of the model. It is thus obtained that:

$$p(D \mid C_i, x_1, \ldots x_M) = \max_{j=1,\ldots,M} p(D \mid C_i, x_j) \quad (5)$$

Let us now consider the following example. Two sensors s1 and s2 positioned in $x_1$ and $x_2$ see a given cell $C_i$ with visibility judgments 0.8 and 0.6, respectively.

It is assumed that the other sensors do not see the given cell in any preset, or that they are positioned in presets where they cannot see the given cell.

It is thus obtained that $p(D|C_i,x_1)=0.8$, $p(D|C_i,x_2)=0.6$, $p(D|C_i,x_j)=0$ $j>2$ and that, from the previous expression, $p(D|C_i, x_1, x_2, \ldots, x_M)=0.8$.

By developing (4) based on this assumption, it will thus be obtained that:

$$p(D \mid C_1 \cup C_2 \cup \ldots \cup C_N, x_1, \ldots, x_M) = \quad (6)$$

$$\frac{\sum_{i=1}^{N} \max_{j=1,\ldots,M} p(D \mid C_i, x_j)}{N}$$

where $p(D|C_i,x_j)$ is the monitoring judgment with which sensor j in preset $x_j$ is monitoring cell $C_i$. The above expression quantifies in a rigorous manner the quality of the coverage of a given area, thus allowing to compare different configurations of sensors used for that purpose.

The optimal configuration $\hat{x}_1, \hat{x}_2, \ldots, \hat{x}_M$ can be searched for among all possible configurations as explained below.

The algorithm that allows the optimal configuration to be found starts from the information contained in the cell/sensor graph (FIG. 2c) drawn when setting up the surveillance system.

For each cell there are one or more arches that tie the cell to the sensors that monitor it.

For each arch there is a piece of information indicating the sensor preset. By taking into account all the cells of the area to be covered, it is possible to build the set of sensors to be used for obtaining said coverage, with the respective preset.

The optimal sensor configuration $\hat{x}_1, \hat{x}_2, \ldots, \hat{x}_M$ is the one which maximizes the detection probability; hence, in a preferred solution the algorithm proceeds by calculating (6) for every sensor combination, and then chooses the sensor combination having the highest detection probability.

This will become apparent from the following example: given three cells $C_1$, $C_2 e C_3$; cell $C_1$ is seen by sensor 1 in preset $x_1^1$, cell $C_2$ is seen by sensor 2 in preset $x_2^1$ and in preset $x_2^2$, and cell $C_3$ is seen by sensor 2 in preset $x_2^2$.

The range of possible configurations consists of the pairs $(x_1^1, x_2^1)$ and $(x_1^1, x_2^2)$.

Of course, a configuration like $(x_1^1, x_2^1, x_2^2)$ is not acceptable because at any instant of time a given sensor can only be in one position.

Once the two possible configurations have been determined, the algorithm calculates the detection probabilities corresponding to said two configurations.

Let us now assume that all monitoring judgments are equal to 1, except the one of preset 4, which is 0.8 (this preset sees 2 cells, but with inferior quality).

In these conditions, the first configuration $(x_1^1, x_2^1)$ has a probability of detecting an anomalous event occurring within the environment which is equal to $$p(D \mid C_1 \cup C_2 \cup C_3, x_1^1, x_2^1) = \frac{2}{3}$$

Whereas the second configuration $(x_1^1, x_2^2)$ has a probability of detecting an anomalous event occurring within the environment which is equal to $$p(D \mid C_1 \cup C_2 \cup C_3, x_1^1, x_2^2) = \frac{2.6}{3}$$

The algorithm then compares the two calculated detection probabilities and chooses the configuration $(x_1^1, x_2^2)$, i.e. the one that maximizes the probability of detecting an event in a given area, which in this case corresponds to the entire environment.

It is apparent from the above description that if the number of possible configurations is large, searching for the optimal configuration may be a heavy computational task.

In such a case, operational research methods may be applied in order to obtain a sub-optimal solution.

These methods, although based on the monitoring judgments and on the cell/sensor graph, minimize a suitable cost function obtained from the detection probability.

Alternatively, computational complexity may also be reduced by introducing heuristic methodologies; for example, one may choose to set every sensor to the position that has the highest monitoring judgment, so as to monitor one or more cells which are seen only by that sensor.

Once established, these heuristic methodologies are independent of the calculation of the detection probability, even though this probability may be used for comparing the performance of different heuristic methodologies when designing the algorithm: if several heuristic methodologies are proposed, the calculation of the detection probability will allow to establish which configuration among those proposed by the heuristic methodologies is most appropriate for detecting events.

Optimal Coverage with the Lowest Number of Sensors

The optimal coverage problem discussed in the previous section can be supplemented by the constraint of having to use the lowest possible number of sensors.

The algorithm for calculating the optimal coverage with the lowest number of sensors is also based on the assumption that the probability of detecting an event in a cell does not increase with the number of sensors used for covering that cell. It is thus assumed that:

$$p(D \mid C_i, x_1, \ldots x_M) = \max_{j=1,\ldots,M} p(D \mid C_i, x_j) \quad (7)$$

Therefore, the algorithm only considers the sensor having the highest monitoring judgment among all those sensors that see the same cell.

Sensors having a lower judgment are considered to be redundant. Although from a practical point of view it may be useful to add information from more sensors (e.g. to add frames of an area) in order to improve the monitoring performance to some extent, there are nonetheless situations where it is important that no redundant information is received: an operator receiving redundant information will evaluate what is happening in the monitored scene more slowly and with more difficulty.

Not less important, the use of the minimum number of resources in a multi-user and multi-tasking system will increase the possibility of serving more operators and tasks simultaneously.

The optimal solution in the presence of the aforementioned constraint is found by considering all the possible subsets of the global set of sensors to be used for optimal coverage.

For each subset, the optimal preset configuration is found as described in the previous section 'Algorithm for optimal coverage.'

The solution to the current problem is represented by the minimum cardinality set having the highest detection probability.

It should be remarked that it is not necessary to take into consideration all the possible sensor subsets: when the detection probability of the optimal solution searched for in the sensor subsets having N cardinality is equal to the optimal detection probability searched for in the subsets having N−1 cardinality, then the optimal solution will be a configuration with N−1 sensors.

Therefore, the method advantageously provides for searching the solution to the optimal coverage problem in increasing cardinality sensor subsets.

Optimal Border Coverage

Surveillance systems provide a function called 'target tracking', i.e. tracking a moving target within the monitored environment.

The cell occupied by the target is called 'active cell', while adjacent cells are called 'border cells'.

The adjacencies between the cells are defined in the cell/sensor graph drawn at system setup.

In order to not lose the target, while a sensor is positioned on the active cell the other sensors are so configured as to provide optimal coverage of the border area.

The purpose of the optimal border coverage algorithm is to maximize the following probability:

$$p(D|\overline{C}_k, C_1 \cup C_2 \cup \ldots \cup C_N, x_1, \ldots, x_M) \quad (8)$$

Said probability corresponds to the probability of detecting an event on condition that the event comes from cell k and occurs in one of N border cells $C_i$ of cell k, and that M sensors are in certain positions $x_j$.

Under conditions similar to those described for the optimal coverage calculation, the detection probability is given by the following relationship:

$$p(D \mid \overline{C}_k, C_1 \cup C_2 \cup \ldots \cup C_N, x_1, \ldots, x_M) = \quad (9)$$

$$\frac{\sum_{i=1}^{N} \max_{j=1,\ldots,M} p(D \mid C_i, x_j) \cdot p(C_i \mid \overline{C}_k)}{\sum_{i=1}^{N} p(C_i \mid \overline{C}_k)}$$

where $p(D|C_i,x_j)$ is the monitoring judgment of sensor j in preset $x_j$ watching cell $C_i$, while $p(C_i|\overline{C}_k)$ is the probability that the target moves from the active cell to the presumably existing border cell i.

According to a preferred embodiment, when creating the environment model during the setup stage it is necessary to specify the probabilities of transition from one cell to another.

These probabilities correspond to the $p(C_i|\overline{C}_k)$ instances in the above formula.

If the information about the probability of transition from one cell to an adjacent one is not specified, as in the embodiment example described with reference to FIGS. 2a-2c and 3a-3b, then all $p(C_i|C_k)$ instances are equal and the relationship for the calculation of the probability of detecting the event in the border cell will be given by:

$$p(D \mid \overline{C}_k, C_1 \cup C_2 \cup \ldots \cup C_N, x_1, \ldots, x_M) = \quad (10)$$

$$\frac{\sum_{i=1}^{N} \max_{j=1,\ldots,M} p(D \mid C_i, x_j)}{N}$$

Optimal Coverage Through Agent Clusters

In order to reduce the computational complexity of the algorithm for optimal coverage, a feasible strategy provides for forming groups of agents (clusters) and having each cluster solve the optimal coverage problem independently of all other clusters.

Therefore, the algorithm of optimal coverage through agent clusters includes a first step wherein the agents must take a shared decision about the composition of the groups.

In a first embodiment, each agent determines the group of agents of its cluster by choosing a preset number of neighbouring agents, the term 'neighbouring agents' referring to agents which control sensors that cover the same environment areas covered by the sensors under its own control.

In other words, two agents are neighbouring agents if they have two respective sensors covering the same area.

Based on this principle, a given agent can form a cluster by choosing its neighbours and then its neighbours's neighbours, and so on, up to a maximum cardinality cluster. Alternatively, in order to form the clusters each agent chooses the neighbouring agents by starting from the one having the lowest identifier (e.g. label) and then determines to which cluster it belongs.

In another embodiment, agent clustering can be carried out on a suitable weighted graph, wherein the nodes are the agents and arches put the agents that have cells in common in relation with each other. The weight of the arches indicates the number of shared cells. The clusters are obtained by using 'minimum cuts' that go through the minimum weight arches in order to separate agents having 'almost' no cells in common from each other.

Once the agents belonging to the cluster have been determined, each agent will apply the above-described algorithm for optimal coverage.

This approach is computationally advantageous and stable.

The invention claimed is:

1. A method for coordinating a plurality of sensors used for surveillance of an environment, wherein a plurality of networked computers control said sensors for a purpose of providing one or more services requested through a network, wherein, in order to coordinate with one another, said computers carry out the following steps:

exchanging information regarding characteristics of each of said plurality of networked computers and the one or more services provided by each of said plurality of networked computers by controlling said plurality of sensors over the network, so that every computer of said plurality of networked computers knows the characteristics of and the one or more services provided by the other computers of said plurality of networked computers, reviewing a service requested through the network,
defining, based on the service requested through the network, a team of computers of said plurality of networked computers which will provide the service requested through the network,
and
executing, by said team of computers, a configuration algorithm based on the service requested through the network to define a set of tasks, such that:
determining, by said team of computers, the tasks to be carried out by each computer of said team of computers as a function of the characteristics of the computers of said team providing the service requested through the network, so that all the computers of said team providing the service requested through the network detect a same optimal team configuration and therefore the tasks to be carried out by each computer of said team, and
controlling said sensors based on the tasks defined by said configuration algorithm.

2. The method according to claim 1, wherein said team of computers executes said configuration algorithm periodically.

3. The method according to claim 1, wherein said team of computers executes said algorithm in response to a variation in a set of said services requested through the network.

4. The method according to claim 1, wherein each computer of said team of computers decides independently which services to execute and informs the other computers on said team of computers about its decision, so that each computer on said team of computers knows which other computers on said team of computers are also carrying out a certain service.

5. The method according to claim 1, wherein the computers on said team of computers decide which services to carry out in a cooperative manner, so that each computer on said team of computers knows which other computers on said team of computers are also carrying out a certain service.

6. The method according to claim 5, wherein, in order to decide which services to carry out, each computer on said team of computers:
evaluates a set of service requests received over the network,
selects the services it can participate in,
informs the other computers on said team of computers about the services it will participate in,
receives over the network a list of services which can be executed by each computer on said team of computers, and
executes a service assignment algorithm that returns the services in which each computer on said team of computers must participate.

7. The method according to claim 1, wherein at least one computer of said plurality of networked computers and at least one of said plurality of sensors are comprised within the same electronic unit, in particular a video camera.

8. The method according to claim 1, wherein the computers of said plurality of networked computers communicate over the network by using different communication methods for different types of information.

9. The method according to claim 1, wherein the computers of said plurality of networked computers exchange information in broadcast mode.

10. The method according to claim 1, wherein the computers of said plurality of networked computers are grouped on a basis of their characteristics of vicinity or affinity for executing specific services, and wherein a computer belonging to one or more teams of computers only communicates with other computers of said one or more teams of computers by using multicast or point-multipoint communication.

11. The method according to claim 1, wherein said computers of said plurality of networked computers transmit status information to one another periodically.

12. The method according to claim 1, wherein a service request is transmitted periodically over the network until a corresponding service is no longer requested.

13. The method according to claim 1, wherein at least one service request is sent by a computer of said plurality of networked computers.

14. The method according to claim 1, wherein at least one service request is sent by an operator through a monitoring station.

15. A method for coordinating a plurality of sensors used for surveillance of an environment, wherein a plurality of networked computers control said sensors for a purpose of providing one or more services requested through a network, wherein, in order to coordinate with one another, said computers carry out the following steps:
exchanging information regarding characteristics of each of said plurality of networked computers and the one or more services provided by each of said plurality of networked computers by controlling said plurality of sensors over the network, so that every computer of said plurality of networked computers knows the characteristics of and the services provided by the other computers of said plurality of networked computers,
reviewing a service requested through the network,
defining, based on the service requested through the network, a team of computers of said plurality of networked computers which will provide the service requested through the network,
and
executing, by said team of computers, a configuration algorithm based on the service requested through the network to define a set of tasks, such that:
determining, by said team of computers the tasks to be carried out by each computer of said team of computers as a function of the characteristics of the computers of said team providing said service requested through the network, so that all the computers of said team providing the service requested through the network detect a same optimal team configuration and therefore the tasks to be carried out by each computer of said team, and
controlling said sensors based on the tasks defined by said configuration algorithm,
wherein the computers of said team of computers execute said configuration algorithm periodically, wherein the computers of said team of computers execute said algorithm in response to a variation in a set of said services requested through the network, wherein each computer of said team of computers decides independently which services to execute and informs the other computers on said team of computers about its decision, so that each computer on said team of computers knows which other computers on said team of computers are also carrying out a certain service, wherein at least one computer of said plurality of networked computers and at least one of said plurality of sensors are comprised within the same electronic unit, in particular a video camera, wherein the computers of said plurality of networked computers communicate over the network by using different communication methods for different types of information, wherein said computers of said plurality of networked computers exchange information in broadcast mode, wherein said computers of said plurality of networked computers are grouped on a basis of their characteristics of vicinity or affinity for executing specific services, and wherein a computer belonging to one or more teams only communicates with other computers of said one or more teams by using multicast or point-multipoint communication, wherein said computers of said plurality of networked computers transmit status information to one another periodically, wherein a service request is transmitted periodically over the network until the corresponding service is no longer requested, wherein at least one service request is sent by a computer of said plurality of networked computers, wherein at least one service request is sent by an operator through a monitoring station, and wherein the computers on said team of computers decide which services to carry out in a cooperative manner, so that each computer on said team of computers knows which other computers on said team of computers are also carrying out a certain service, wherein, in order to decide which services to carry out, each computer on said team of computers:

evaluates a set of service requests received over the network, selects the services it can participate in, informs the other computers of said team of computers about the services it will participate in, receives over the network a list of services which can be executed by each computer of said team of computers, and executes a service assignment algorithm that returns the services in which each computer of said team of computers must participate.

16. A method for coordinating a plurality of sensors used for surveillance of an environment, wherein a plurality of networked computers control said sensors for a purpose of providing one or more services requested through a network, wherein, in order to coordinate with one another, said computers carry out the following steps:

exchanging information regarding characteristics of each of said plurality of networked computers and the one or more services provided by each of said plurality of networked computers by controlling said plurality of sensors over the network, so that every computer of said plurality of networked computers knows the characteristics of and the one or more services provided by the other computers of said plurality of networked computers, reviewing a service requested through the network, defining, based on the service requested through the network, a team of computers of said plurality of networked computers which will provide the service requested through the network, and executing, by said team of computers, a configuration algorithm based on the service requested through the network to define a set of tasks, such that:

determining, by said team of computers, the tasks to be carried out by each computer of said team of computers as a function of the characteristics of the computers of said team providing the service requested through the network, so that all the computers of said team providing the service requested through the network detect a same optimal team configuration and therefore the tasks to be carried out by each computer of said team, and controlling said sensors based on the tasks defined by said configuration algorithm, wherein the computers of said team of computers execute said configuration algorithm periodically, wherein the computers of said team of computers execute said algorithm in response to a variation in a set of said services requested through the network, and wherein each computer of said team of computers decides independently which services to execute and informs the other computers on said team of computers about its decision, so that each computer on said team of computers knows which other computers on said team of computers are also carrying out a certain service.

17. The method according to claim 16, wherein said team of computers decide which services to carry out in a cooperative manner, so that each computer on said team of computers knows which other computers on said team of computers are also carrying out a certain service, and wherein, in order to decide which services to carry out, each computer on said team of computers:

evaluates a set of service requests received over the network, selects the services it can participate in, informs the other computers of said team of computers about the services it will participate in, receives over the network a list of services which can be executed by each computer of said team of computers, and executes a service assignment algorithm that returns the services in which each computer of said team of computers must participate.

18. The method according to claim 16, wherein at least one computer of said plurality of networked computers and at least one of said plurality of sensors are comprised within the same electronic unit, in particular a video camera, wherein the computers of said plurality of networked computers communicate over the network by using different communication methods for different types of information.

19. The method according to claim 16, wherein said computers of said plurality of networked computers exchange information in broadcast mode, wherein said computers of said plurality of networked computers are grouped on a basis of their characteristics of vicinity or affinity for executing specific services, and wherein a computer belonging to one or more teams only communicates with other computers of said one or more teams by using multicast or point-multipoint communication.

20. The method according to claim 16, wherein a service request is transmitted periodically over the network until the corresponding service is no longer requested, wherein at least one service request is sent by a computer of said plurality of networked computers, and wherein at least one service request is sent by an operator through a monitoring station.

* * * * *

UNITED STATES PATENT AND TRADEMARK OFFICE
CERTIFICATE OF CORRECTION

PATENT NO. : 8,370,421 B2
APPLICATION NO. : 12/600887
DATED : February 5, 2013
INVENTOR(S) : Gennari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 433 days.

Signed and Sealed this

First Day of September, 2015

Michelle K. Lee
*Director of the United States Patent and Trademark Office*